United States Patent
Schwarzer et al.

(10) Patent No.: US 11,682,952 B2
(45) Date of Patent: Jun. 20, 2023

(54) METHOD FOR PRODUCING A WIRE COIL, CORRESPONDING WIRE COIL, AND METHOD FOR PRODUCING AN ELECTRICAL MACHINE

(71) Applicant: AUDI AG, Ingolstadt (DE)

(72) Inventors: Michael Schwarzer, Munich (DE); Mohammed Razki, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 153 days.

(21) Appl. No.: 17/190,862

(22) Filed: Mar. 3, 2021

(65) Prior Publication Data

US 2021/0296974 A1  Sep. 23, 2021

(30) Foreign Application Priority Data

Mar. 23, 2020 (DE) .......................... 102020107909.5

(51) Int. Cl.
*H02K 15/08* (2006.01)
*H02K 3/28* (2006.01)
*H02K 15/10* (2006.01)
*H02K 3/38* (2006.01)
*H02K 15/00* (2006.01)

(52) U.S. Cl.
CPC .............. *H02K 15/08* (2013.01); *H02K 3/28* (2013.01); *H02K 3/38* (2013.01); *H02K 15/0043* (2013.01); *H02K 15/105* (2013.01)

(58) Field of Classification Search
CPC ....... H02K 3/50; H02K 15/0037–0043; H02K 15/0068–0087; H02K 3/38
See application file for complete search history.

(56) References Cited

U.S. PATENT DOCUMENTS

| | | | |
|---|---|---|---|
| 2007/0080592 A1* | 4/2007 | Ohta | ........................ B60L 7/12 310/194 |
| 2013/0043749 A1 | 2/2013 | Nonoguchi et al. | |
| 2016/0204668 A1* | 7/2016 | Shahamat | .............. H02K 3/345 310/43 |

FOREIGN PATENT DOCUMENTS

| | | |
|---|---|---|
| DE | 202007007580 U1 | 9/2007 |
| DE | 102008042242 A1 | 4/2010 |
| DE | 102014005147 A1 | 10/2015 |
| DE | 102017214776 A1 | 4/2018 |
| EP | 1 276 208 A2 | 1/2003 |
| EP | 1276208 A2 * | 1/2003 ........... H02K 15/095 |
| EP | 1 276 208 A3 | 8/2004 |
| JP | 2002281708 A * | 9/2002 |

OTHER PUBLICATIONS

Machine translation of JP-2002281708-A (Year: 2002).*
Machine translation of EP-1276208-A2 (Year: 2003).*

(Continued)

*Primary Examiner* — Ahmed Elnakib
*Assistant Examiner* — Minki Chang
(74) *Attorney, Agent, or Firm* — Maier & Maier, PLLC

(57) ABSTRACT

A method for producing a wire coil. Multiple windings of a ply of the wire coil including an insulated wire are wound onto a coil core of the wire core starting from a first winding up to a last winding. The last winding is hooked in an electrically insulating deflection hook of the wire coil which is fixed with respect to the coil core and the wire is deflected by the deflection hook.

14 Claims, 2 Drawing Sheets

(56) References Cited

OTHER PUBLICATIONS

Office Action dated Jul. 13, 2022 in connection with corresponding German Application No. 10 2020 107 909.5; 5 pages including partial English-language translation.
German Examination Report dated Feb. 15, 2021 in corresponding German Application No. 102020107909.5; 13 pages; Machine translation attached.

* cited by examiner

METHOD FOR PRODUCING A WIRE COIL, CORRESPONDING WIRE COIL, AND METHOD FOR PRODUCING AN ELECTRICAL MACHINE

FIELD

The invention relates to a method for producing a wire coil, wherein multiple windings of a ply of the wire coil consisting of an insulated wire are wound onto a coil core of the wire core starting from a first winding up to a last winding. The invention furthermore relates to a corresponding wire coil and a method for producing an electrical machine.

BACKGROUND

Document DE 10 2008 042 242 A1, for example, is known from the prior art. This describes a method for producing an armature rotor of a commutator motor, having a stator which includes multiple stator poles, wherein the armature rotor includes multiple armature teeth, which are arranged on the circumference of the armature rotor with rotor slots in between, and a commutator which has multiple lamellae and associated winding hooks, having the following steps: winding bridges of the commutator by connecting winding hooks of the lamellae of the commutator; winding the windings of armature teeth and connecting the respective winding ends to the winding hooks of the lamellae of the commutator.

Furthermore, document DE 10 2017 214 776 A1 discloses a method for manufacturing a rotor for an electrical machine having a contactless power transmission system, wherein a winding head cover is arranged on one end face of a laminated core of the rotor. It is provided that a secondary unit of the power transmission system is integrated into the winding head cover and, as a result, the secondary unit is held on the rotor indirectly via the winding head cover after the winding head cover has been arranged.

SUMMARY

It is the object of the invention to propose a method for producing a wire coil which has advantages over known methods, in particular a high degree of flexibility with regard to the design of the wire coil, for example with regard to a winding window, and enables a reliable electrical connection of the wire coil to another wire coil.

This object is achieved according to the invention by a method for producing a wire coil. It is provided that the last winding is hooked in an electrically insulating deflection hook of the wire coil which is fixed with respect to the coil core and the wire is deflected by means of the deflection hook.

The wire coil is, for example, part of an electrical machine, in particular an electric motor or a generator. In the case of the electric motor, the electric machine is preferably provided and designed for driving a motor vehicle, that is to say in this respect for providing a drive torque intended to drive the motor vehicle. In this case, the electrical machine can also be referred to as a traction machine. The electrical machine is available, for example, as a separately excited synchronous machine. The electrical machine has a large number of wire coils which are associated with a rotor or a stator of the electrical machine. In addition to the wire coil mentioned here, the electrical machine thus has at least one further wire coil. In other words, the wire coil is one of multiple wire coils.

If the wire coil is part of the electrical machine, a tooth of the rotor or stator is used as the coil core of the wire coil. The ply of the wire coil is wound onto the coil core or the tooth. It consists of the insulated wire which, in the case of the electrical machine, is used to produce multiple electrically interconnected wire coils. In this respect, the wire extends continuously and uninterruptedly between the multiple wire coils. Of course, however, it can also be provided that the wire coil is not provided as a component of an electrical machine, but as an independent component or as a component of any electrical device.

The wire coil basically includes the ply and the coil core, wherein the ply encompasses the coil core multiple times in the circumferential direction with respect to a longitudinal center axis of the coil core to form the multiple windings of the ply. A winding is thus to be understood to mean a section of the wire which encompasses the coil core exactly once in the circumferential direction, that is to say extends over an angle of exactly 360° with respect to the longitudinal center axis of the coil core. The windings include the first winding and the last winding, which can be directly adjacent to one another or connected directly to one another.

However, there is preferably at least one further winding between the first winding and the last winding, so that the first winding is electrically connected to the last winding via this further winding. The first winding is on the input side of the ply and the last winding is on the output side of the ply. The ply is thus delimited on one side by its first winding and on its other side by the last winding. The first winding is to be understood as that winding of the ply which completely encompasses the coil core for the first time. The last winding, on the other hand, is that winding of the ply which encompasses the coil core for the last time.

The first winding is usually fixed in place with respect to the coil core by means of further windings of the ply. For example, the first winding presses directly against the coil core and is overlapped by the further windings, so that it is pushed by the further windings in the direction of the coil core or against the coil core. The first winding is therefore on the side of the ply facing towards the coil core. This is not the case for the last winding, rather it is arranged on the side of the ply facing away from the coil core, that is to say on the outside.

This means that the last winding can easily shift if the wire is continued starting from the last winding, for example to the further wire coil, which is also produced from the insulated wire. In order to prevent such a shift of the last winding and to create a correspondingly high degree of flexibility in the design of the wire coil, the wire coil is associated with the deflection hook.

The deflection hook is fixed with respect to the coil core, that is to say in particular fastened directly or indirectly on the coil core. This fastening can take place, for example, by wrapping the ply or at least one winding of the ply around the deflection hook. Alternatively, the deflection hook is fastened directly on the coil core, for example fastened in a materially bonded or formfitting manner. It can therefore be provided that the deflection hook is glued, welded, soldered, or the like to the coil core.

The last winding of the ply is now hooked into the deflection hook, namely in such a way that the wire is deflected. The deflection is preferably designed such that the wire is held in the deflection hook, that is, it cannot get out of it. The deflection hook is basically to be understood as a deflection hook in the hook opening of which the wire of the last winding is at least partially received. The deflection hook particularly preferably encompasses the hook opening with respect to a center point of the hook opening over at least 120°, at least 150° or at least 180°, in particular exactly 180°, particularly preferably in the form of a partial circle. For example, the deflection hook is provided in the form of a bent-over wire.

The deflection hook is designed to be electrically insulating. For example, for this purpose it consists of a non-conductive material. The deflection hook is thus not used to electrically connect the ply, but only to mechanically hold the last winding with respect to the coil core. With the aid of the described procedure for producing the wire coil or the described design of the wire coil or the described design of the wire coil, reliable fixing of the last winding with respect to the coil core is achieved, so that, on the one hand, the wire coil can be manufactured quickly and efficiently and, on the other hand, the deflection can be implemented with a particularly large deflection angle. Accordingly, the design of the wire coil or the electrical machine is possible with a greater degree of freedom than with other methods.

One refinement of the invention provides that the ply—viewed in section—is produced with a winding window that widens in the direction of a longitudinal center axis of the coil core. The winding window is to be understood as that region of the wire coil in which the ply is arranged or which is filled by the ply, namely viewed in longitudinal section with respect to the longitudinal center axis of the coil core. The winding window is now not to have a uniform width, but rather to enlarge in the direction of the longitudinal center axis. This means that the winding window at a base of the coil core, viewed in longitudinal section, has smaller dimensions than at a head of the coil core.

The increase in the dimensions of the winding window can take place uniformly or continuously starting from the base of the coil core. For example, the dimensions increase continuously starting from the base up to the head. However, it can also be provided that the winding window is only widened in some regions, for example starting from the base up to a point spaced apart from the head. Starting from this point up to the head, the winding window no longer widens, but has, for example, constant dimensions or diminishing dimensions.

The first winding of the ply is preferably arranged in a region of the winding window in which it has smaller dimensions than in that region in which the last winding is present. In addition, the wire of the last winding is preferably deflected in the direction of the smaller dimensions of the winding window. Without the deflection hook, if the wire is deflected too much, the last winding can slip off in the direction of the smaller dimensions of the winding window. This is effectively prevented with the aid of the deflection hook.

One refinement of the invention provides that the last winding is formed spaced apart from the first winding in the direction of the longitudinal center axis, in particular has a spacing of at least 50%, at least 75% or at least 90% from the first winding with respect to the extent of the winding window in this direction. In the case of the electrical machine, this means in particular that the last winding has a greater spacing from the rotor in the radial direction with respect to an axis of rotation of the rotor than the first winding. The first winding is thus arranged further inward in the radial direction than the last winding.

The winding window has dimensions with respect to the longitudinal center axis of the coil core, namely in particular starting from the base of the coil core up to its head. The first winding and the last winding are preferably located on opposite sides of an imaginary plane perpendicular to the longitudinal center axis of the coil core and extending centrally through the winding window. In relation to the dimensions of the winding window in the axial direction with respect to the longitudinal center axis of the coil core, the spacing between the first winding and the last winding is at least 50% or more viewed in section. It is particularly preferably at least 75% or at least 90%. This enables a particularly flexible arrangement of the ply in the winding window.

One refinement of the invention provides that the deflection hook is fastened to the coil core or is wrapped in the ply in order to fix it with respect to the coil core. The fixing can therefore be carried out by directly or indirectly fastening the deflection hook on the coil core. In the case of direct fastening, the deflection hook engages directly on the coil core. For example, it is connected to the coil core in a materially bonded or formfitting manner, for example by gluing, welding, soldering, or the like.

Additionally or alternatively, the deflection hook is wrapped in the ply. The ply is arranged in the winding window or on the coil core in such a way that it is fixed with respect to the coil core. In addition, the deflection hook is arranged in the ply in such a way that it is fixed with respect to it, so that ultimately the deflection hook is fixed with respect to the coil core. Wrapping the deflection hook into the ply is to be understood to mean that at least one winding, but preferably multiple windings of the ply encompass the deflection hook in order to fix it.

For example, the deflection hook rests on one or more windings of the ply, on the one hand, and, on the other hand, is also encompassed by one or more windings of the ply so that it is fixed between them. Both variants enable the deflection hook to be reliably fixed using structurally simple means.

One refinement of the invention provides that the deflection hook is arranged in such a way that it supports the last winding in the direction of the longitudinal center axis, in particular in the direction of a tapering of the winding window. The deflection hook thus prevents the last winding from shifting in a first axial direction with respect to the longitudinal center axis, whereas it allows a shift in a second axial direction opposite to the first axial direction. The deflection hook is arranged or aligned in such a way that it enables the wire to be deflected, that is to say it supports the deflected region of the wire. The last winding is supported in particular in such a way that the last winding is prevented from shifting in the direction of the tapering of the winding window. The above-described slipping off of the last winding is effectively prevented in this way.

One refinement of the invention provides that a deflection hook made of a plastic or an insulated metal is used as the deflection hook. The plastic is either a non-conductive plastic or—if an electrically conductive plastic is used—is insulated. The metal is insulated in each case. This is to be understood to mean that the deflection hook includes electrical insulation, so that an electrical connection between the wire of the ply and the deflection hook is reliably and effectively prevented. The insulation can be in the form of a coating, a paint, or a cladding. The deflection hook solely has a supporting or deflecting effect on the wire and is in no way used to make electrical contact with the same.

The invention furthermore relates to a wire coil, in particular a wire coil produced by the method according to the statements within the scope of this description, wherein multiple windings of a ply of the wire coil consisting of an insulated wire starting from a first winding to a last winding are wound on a coil core of the wire coil. It is provided that the last winding is hooked in an electrically insulating deflection hook of the wire coil which is fixed with respect to the coil core and the wire is deflected by means of the deflection hook.

The advantages of such an embodiment of the wire coil and of such a procedure have already been discussed. Both the wire coil and the method for its production can be refined according to the embodiments within the scope of this description, to which reference will therefore be made.

The invention moreover relates to a method for producing an electrical machine which has at least one wire coil, in particular a wire coil produced by the method according to the statements within the scope of this description, wherein multiple windings of a ply of the wire coil consisting of an insulated wire starting from a first winding up to a last winding are wound on a coil core of the wire coil. It is provided that the last winding is hooked in an electrically insulating deflection hook of the wire coil which is fixed with respect to the coil core and the wire is deflected by means of the deflection hook.

With regard to the advantages and possible developments of the electrical machine and the method for producing it, reference is again made to the statements made within the context of this description.

One refinement of the invention provides that the electrical machine has a further wire coil and multiple further windings of a further ply of the further wire coil consisting of the insulated wire starting from a further first winding to a further final winding are wound on a further coil core of the further wire coil, wherein the wire of the wire coil deflected by means of the deflection hook is guided to the further first winding of the further ply.

In addition to the wire coil, the electrical machine thus has the further wire coil. Of course, any number of such further wire coils can be present, which are electrically connected in series, so that the wire of the wire coil is first led to a first of the further wire coils and then to a subsequent one of the further wire coils. The further wire coil is preferably designed identically to the wire coil, so that reference is made to the corresponding statements within the context of this description.

The further wire coil is produced after the wire coil. First, the ply of the wire coil is thus applied to the coil core and the last winding of this ply is hooked into the deflection hook of the wire coil. The wire is then deflected around the deflection hook, namely in the direction of the further first winding of the further ply. A particularly small spacing of the wire coil and the further wire coil from one another is achieved in this way, in particular in the circumferential direction with respect to an axis of rotation of the rotor, wherein a particularly clear deflection of the wire is possible without the last winding slipping off.

One refinement of the invention provides that the wire is deflected by means of the deflection hook by at least 60°, at least 75°, at least 90°, or more than 90°. Such a clear deflection results in a particularly small spacing between the wire coil and the further wire coil and therefore a small overall size of the electrical machine. This can thus be designed to be particularly compact.

BRIEF DESCRIPTION OF THE FIGURES

In the following, the invention will be explained in greater detail with reference to the exemplary embodiments depicted in the drawings, without this restricting the invention. In the figures.

DETAILED DESCRIPTION

Figure 1:
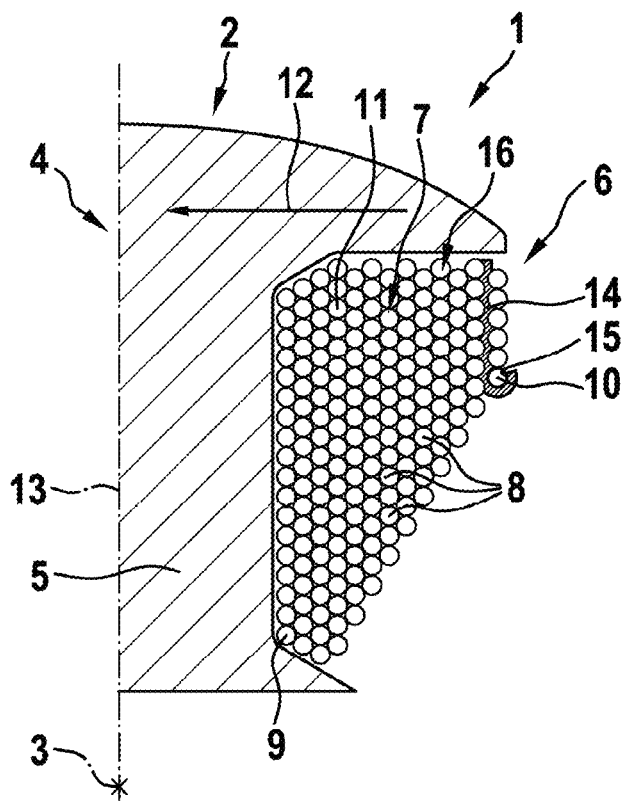
FIG. 1 shows a schematic sectional illustration through a region of an electrical machine having a wire coil, which is associated with a deflection hook which is provided in a first embodiment.

FIG. 1 shows a schematic sectional illustration of an electrical machine 1. A rotor 2 is shown solely by way of example, which is mounted rotatably about an axis of rotation 3, which is only indicated by way of example, with respect to a stator (not shown) of the electrical machine 1. The rotor 2 has multiple teeth 4, only one of which is partially shown here. The tooth 4 is used as the coil core 5 of a wire coil 6 which, in addition to the coil core 5, has a ply 7 which is composed of a plurality of windings 8, only a few of which are identified by way of example. A first winding 9 of the windings 8, like a last winding 10 of the windings 8, is indicated purely by way of example. The ply 7 is formed in a winding window 11. The ply 7 is wound in the direction of the arrow 12.

It can be seen that the winding window 11 widens in the direction of a longitudinal center axis 13 of the coil core 5, namely in the direction facing away from the axis of rotation 3. In order to prevent the last winding 10 from slipping off in the direction of the axis of rotation 3, the wire coil 6 has a deflection hook 14. This encloses a hook opening 15 in which the last winding 10 is arranged at least in sections. By means of the deflection hook 14, a wire 16, of which the ply 7 consists, is deflected, in particular deflected abruptly at the deflection hook 14. The deflection preferably takes place in the radial direction towards the axis of rotation 3, namely in the direction of a further first winding (not shown here) of a further ply of a further wire coil. In the first exemplary embodiment shown here, the deflection hook 14 is only fixed indirectly via the ply 7 with respect to the coil core 5. This is done by wrapping the deflection hook 14 using multiple windings 8 of the ply 7.

Figure 2:
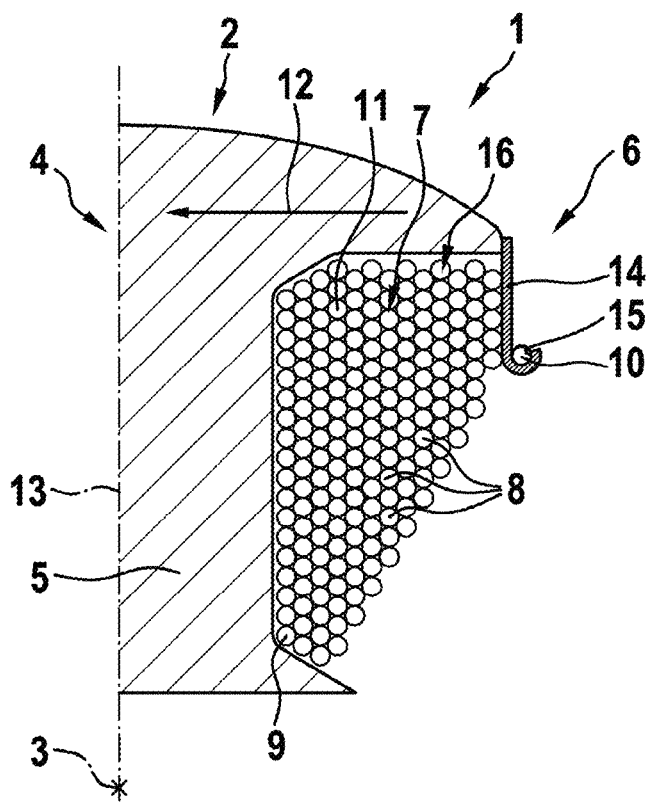
FIG. 2 shows a schematic sectional illustration of the electrical machine, wherein the deflection hook is shown in a second embodiment.

FIG. 2 shows a schematic sectional illustration of the electrical machine 1, wherein the deflection hook 14 is shown in a second embodiment. Reference is made to the entirety of the statement on the first embodiment and only the differences are pointed out below. These are due to the fact that the deflection hook 14 is not only fastened indirectly, but rather directly to the coil core 5. For this purpose, it rests on the outside of the coil core 5, in particular on a head of the coil core 5. For example, the deflection hook 14 is connected to the coil core 5 in a materially bonded manner. It is clear that, as in the first embodiment, the spacing between the first winding 9 and the last winding 10 in the direction of the longitudinal center axis 13 is less than the extent of the winding window 11 in the same direction. For example, the spacing is at most 80%, at most 75%, or at most 70% of the extent of the winding window 11.

Figure 3:
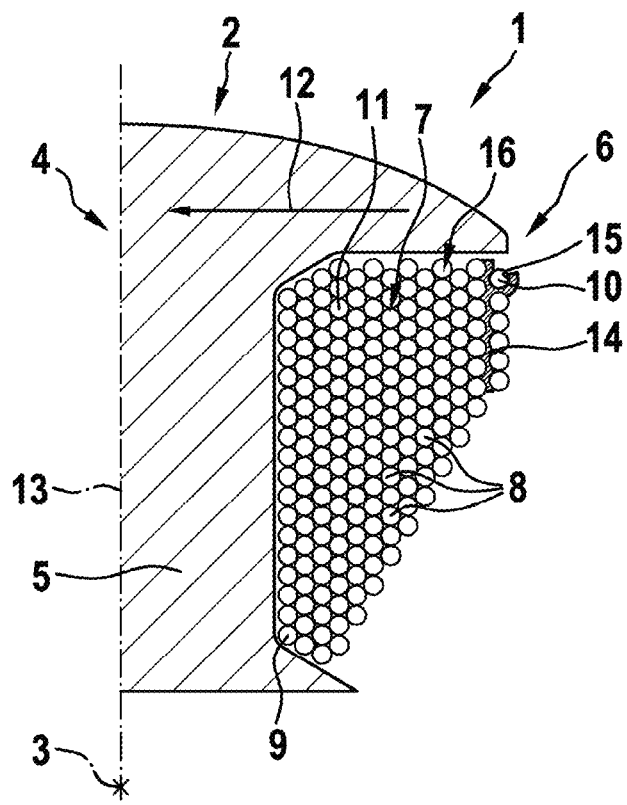
FIG. 3 shows a schematic sectional illustration of the electrical machine, wherein the deflection hook is provided in a third embodiment.

FIG. 3 shows a further sectional illustration of the electrical machine 1, wherein the deflection hook 14 is shown in a third embodiment. Again, reference is made to the statements relating to the first embodiment and only the differences are discussed.

This is because the spacing between the first winding 9 and the last winding 10 in the direction of the longitudinal center axis 13 is greater than in the first embodiment and in the second embodiment. For example, the spacing is at least 90% or at least 95% of the extent of the winding window in this direction. In other words, the first winding 9 is provided on one side and the last winding 10 is provided on the other side of the winding window. Again in the third embodiment, the deflection hook 14 is only indirectly connected to the coil core 5, namely via the ply 7.

Figure 4:
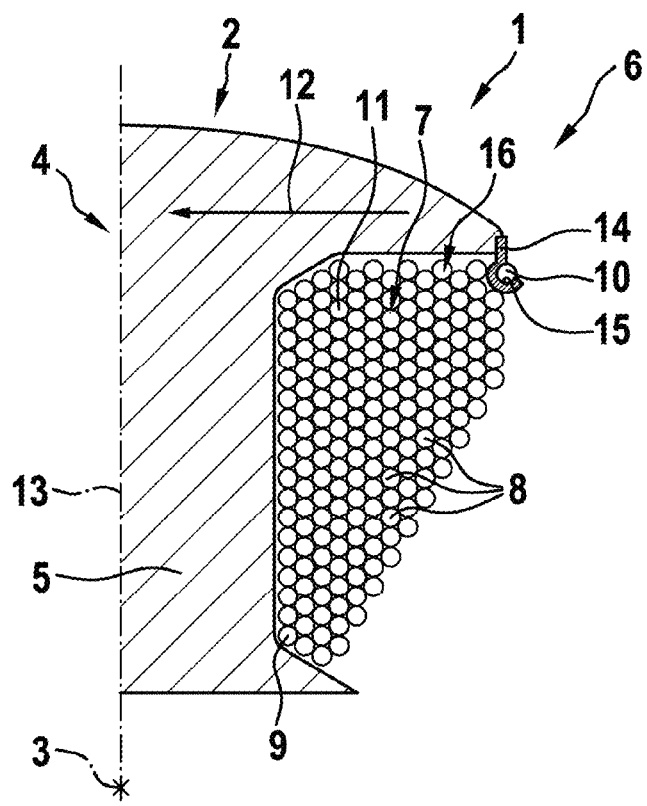
FIG. 4 shows a schematic sectional illustration of the electrical machine, wherein the deflection hook is provided in a fourth embodiment.

FIG. 4 shows a schematic sectional illustration of the electrical machine 1. The fourth embodiment is designed similarly to the further embodiments, so that reference is made to the above statements and only the differences are discussed below. These lie in the fact that the spacing between the first winding 9 and the last winding 10, as for the third embodiment, is significantly greater than for the first embodiment and the second embodiment. In contrast to the third embodiment, however, as in the second embodiment, the deflection hook 14 is directly connected to the coil core 5 or fastened directly on it.

The described embodiment of the electrical machine 1 or the method for producing it has the advantage that a significantly stronger deflection of the wire 16 can be carried out with the aid of the deflection hook 14 than in other electrical machines. Correspondingly, the coil cores 5 or the teeth 4 of the electrical machine 1 can be arranged closer to one another, so that a smaller design of the electrical machine 1 results. In addition, the production of the ply 7 is significantly simplified.

LIST OF REFERENCE SIGNS

1 electrical machine
2 rotor
3 axis of rotation
4 teeth
5 coil core
6 wire coil
7 ply
8 windings
9 first winding
10 last winding
11 winding window
12 arrow
13 longitudinal center axis
14 deflection hook
15 hook opening
16 wire

The invention claimed is:

1. A method for producing a wire coil, comprising:
    winding at least three windings of a ply of the wire coil consisting of an insulated wire starting from a first winding to a last winding onto a coil core of the wire coil;
    wrapping the at least three windings on an electrically insulating deflection hook of the wire coil;
    hooking the last winding in the electrically insulating deflection hook of the wire coil which is fixed with respect to the coil core; and
    deflecting the wire coil by the electrically insulating deflection hook proximate the last winding, wherein each winding between the first winding and the last winding is spaced at a uniformly greater distance from a longitudinal center axis of the coil core and the last winding of the wire coil is deflected by at least 60°.

2. The method according to claim 1, wherein the ply, viewed in section, is produced having a winding window which widens in the direction of the longitudinal center axis of the coil core.

3. The method according to claim 2, wherein the electrically insulating deflection hook is fastened to the coil core or is wrapped in the ply for fixing with respect to the coil core.

4. The method according to claim 2, wherein the electrically insulating deflection hook is arranged in such a way that it supports the last winding in the direction of the longitudinal center axis.

5. The method according to claim 2, wherein a deflection hook made of a plastic or an insulated metal is used as the electrically insulating deflection hook.

6. The method according to claim 1, wherein the electrically insulating deflection hook is fastened to the coil core or is wrapped in the ply for fixing with respect to the coil core.

7. The method according to claim 6, wherein the electrically insulating deflection hook is arranged in such a way that it supports the last winding in the direction of the longitudinal center axis.

8. The method according to claim 6, wherein a deflection hook made of a plastic or an insulated metal is used as the electrically insulating deflection hook.

9. The method according to claim 1, wherein the electrically insulating deflection hook is arranged in such a way that it supports the last winding in the direction of the longitudinal center axis.

10. The method according to claim 9, wherein a deflection hook made of a plastic or an insulated metal is used as the electrically insulating deflection hook.

11. The method according to claim 1, wherein a deflection hook made of a plastic or an insulated metal is used as the electrically insulating deflection hook.

12. A wire coil, comprising:
    at least three windings of a ply of the wire coil consisting of an insulated wire starting from a first winding up to a last winding are wound onto a coil core of the wire coil, wherein the at least three windings are wrapped on an electrically insulating deflection hook of the wire coil, the last winding is hooked in the electrically insulating deflection hook of the wire coil which is fixed with respect to the coil core and the wire coil is deflected by the deflection hook, each winding between the first winding and the last winding is spaced at a uniformly greater distance from a longitudinal center axis of the coil core, and the last winding of the wire coil is deflected by at least 60°.

13. A method for producing an electrical machine, which has at least one wire coil, comprising:
    winding at least three windings of a ply of the wire coil consisting of an insulated wire starting from a first winding up to a last winding onto a coil core of the wire coil;
    wrapping the at least three windings on an electrically insulating deflection hook of the wire coil;
    hooking the last winding in the electrically insulating deflection hook of the wire coil which is fixed with respect to the coil core; and
    deflecting the wire coil by the electrically insulating deflection hook proximate the last winding, wherein each winding between the first winding and the last winding is spaced at a uniformly greater distance from a longitudinal center axis of the coil core.

14. The method according to claim 13, wherein the electrical machine has a further wire coil and multiple further windings of a further ply of the further wire coil consisting of the insulated wire starting from a further first winding to a further last winding are wound on a further coil core of the further wire coil, wherein a wire of the wire coil deflected by the electrically insulating deflection hook is guided to the further first winding of the further ply.

* * * * *